Patented May 11, 1937

2,080,004

UNITED STATES PATENT OFFICE 2,080,004

DOUBLE SALT OF COPPER ARSENITE AND A COPPER SALT OF AN UNSATURATED FATTY ACID AND PROCESS OF MAKING THE SAME

Frederick E. Dearborn, Washington, D. C., dedicated to the free use of the Public No Drawing. Application May 17, 1933, Serial No. 671,568

8 Claims. (Cl. 260—12)

(Granted under the act of March 3, 1883, as amended April 30, 1928; 370 O. G. 757)

This application is made under the act of March 3, 1883, as amended by the act of April 30, 1928 and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

This invention comprehends a new compound or compounds having the composition hereinafter specifically set forth and the mode or process of manufacturing the same which will now be fully described and specifically stated in the following claims, it being understood, however, that changes may be made in such composition of matter and in the step or steps in question, without departing from the spirit of the invention.

I have found that a complex compound or compounds can be made containing arsenic, copper, and a monocarboxylic acid of the general formula $C_nH_{2n-2}O_2$. The compound or compounds are greenish in color and are entirely suitable for insecticidal and fungicidal use. They are practically insoluble in water, with relatively low water-soluble arsenic content.

As indicated the principal and poisonous ingredient in my new insecticide or insecticides comprises mainly a complex compound of three molecules of copper meta-arsenite united with one molecule of a copper salt of a monocarboxylic acid of the general formula $C_nH_{2n-2}O_2$, for example, copper crotono-arsenite $$(3CuAs_2O_4.CuC_8H_{10}O_4)$$

I have made compounds from monocarboxylic acids of the general series $C_nH_{2n-2}O_2$ containing four to twenty-two carbon atoms in the molecule.

In carrying out my invention I first form an alkali salt of the fatty acid by neutralization of the free fatty acid or by saponifying a vegetable, animal or fish oil or fat containing an appreciable amount of the glyceride or glycerides of the monocarboxylic acid or acids of the series $C_nH_{2n-2}O_2$. The resulting soap may be separated from the other saponification products or used without separation in the formation of the new composition of matter. To the soap solution is added the required amount of a solution of a water-soluble arsenite, for example, sodium or potassium arsenite. The soap-arsenite mixture is partially neutralized with a suitable acid, for example, dilute hydrochloric acid, the solution however being kept on the alkaline side to prevent precipitation of the fatty acid or acids. To the partially neutralized solution is slowly added with vigorous agitation, a solution of a soluble copper salt, for example, copper chloride. A greenish yellow precipitate immediately forms. The mass should have an acid reaction when all of the copper solution has been added. If alkaline a suitable acid, for example, dilute hydrochloric acid, is added until the reaction is acid. The mixture is now heated, with continuous agitation, until the reaction is completed as shown by a color change in the precipitate from a greenish yellow color to a bluish green or green color. This may entail boiling for a short time. The precipitate may be filtered at once, but it is preferable to allow it to stand for a few hours. The precipitate is well washed with water by any suitable means to free it of acid and other water-soluble products. It is then dried, preferably in a current of warm air. This precipitate consists of a mixture of the compound or compounds mixed with other materials, such as unsaponified matter, insoluble reaction products formed in the process of mixing the ingredients, and the corresponding copper salt or salts of the fatty acids used in the process of manufacture. The pure compound or compounds are prepared by extracting the above precipitate with a suitable solvent such as carbon tetrachloride.

The compound or compounds may be made from pure or commercial fatty acid or acids or from the vegetable, animal or fish oils and fats containing mixtures of the monocarboxylic acids of the general formula $C_nH_{2n-2}O_2$. The proportions of copper, arsenic and monocarboxylic acid or acids to be mixed may be calculated from the formula $3CuAs_2O_4.CuO$ (monocarboxylic acid anhydride). For examples, the following are given as illustration:

(a) Copper crotono-arsenite formula, $$3CuAs_2O_4.CuC_8H_{10}O_4$$

containing 55.69% arsenious oxide ($As_2O_3$), 29.85% cupric oxide (CuO), 14.46% crotonic anhydride. To produce 100 grams of the compound the following weights of materials are required:

| | Grams |
|---|---|
| Potassium arsenite [$KH(AsO_2)_2.H_2O$] | 76.5 |
| Copper sulphate ($CuSO_4.5H_2O$) | 93.7 |
| Crotonic acid | 16.1 |

(b) Copper oleo-arsenite formula, $$3CuAs_2O_4.CuC_{36}H_{66}O_4$$

containing 40.71% arsenious oxide ($As_2O_3$), 21.82% cupric oxide (CuO), 37.47% oleic anhydride. To produce 100 grams of the compound the following weights of materials are required:

| | Grams |
|---|---|
| Sodium arsenite ($Na_2HAsO_3$) | 69.9 |
| Cupric chloride ($CuCl_2.2H_2O$) | 46.8 |
| Oleic acid | 38.7 |

(c) Copper eruco-arsenite formula, $$3CuAs_2O_4.CuC_{44}H_{82}O_4$$

containing 37.80% arsenious oxide ($As_2O_3$), 20.26% cupric oxide (CuO), 41.94% erucic anhydride. To produce 100 grams of the compound the following weights of materials are required:

| | Grams |
|---|---|
| Arsenious oxide ($As_2O_3$) | 37.8 |
| Sodium hydroxide (NaOH) | 15.3 |
| Cupric nitrate [$Cu(NO_3)_2.3H_2O$] | 61.5 |
| Erucic acid | 44.9 |

An excess of the copper and arsenite salts may be used as cupric arsenite is soluble in dilute acids.

Having fully disclosed my discovery, I claim as my invention:

1. A new compound of the general formula $3CuAs_2O_4.CuOR$ in which R is the anhydride of a monocarboxylic acid of the general formula $C_nH_{2n-2}O_2$.

2. A new insecticide and fungicide comprising the complex products of the reactions between a solution of an inorganic soluble copper salt, an alkali metal arsenite and an alkali metal salt of the monocarboxylic acids of the general formula $C_nH_{2n-2}O_2$.

3. A new compound of the general formula $3CuAs_2O_4.CuOR$, in which R is the anhydride of crotonic acid.

4. A new compound of the general formula $3CuAs_2O_4.CuOR$, in which R is the anhydride of oleic acid.

5. A new compound of the general formula $3CuAs_2O_4.CuOR$, in which R is the anhydride of erucic acid.

6. As an insecticide and fungicide, a compound of the general formula $3CuAs_2O_4.CuOR$, in which R is the anhydride of a monocarboxylic acid of the general formula $C_nH_{2n-2}O_2$, containing from 3 to 22 carbon atoms in its molecule.

7. A process of manufacturing a compound of the general formula $3CuAs_2O_4.CuOR$, in which R is the anhydride of a monocarboxylic acid of the general formula $C_nH_{2n-2}O_2$ containing from 3 to 22 carbon atoms in its molecule; which comprises bringing together a solution of an alkali metal arsenite, a solution of a water soluble inorganic cupric salt, and a solution of an alkali metal salt of a monocarboxylic acid of the general formula $C_nH_{2n-2}O_2$ containing from 3 to 22 carbon atoms in its molecule, obtained by saponifying one of a group consisting of vegetable, animal and fish oils, and fats of the same; heating and agitating the mixture until the reactions have been completed as shown by a color change; filtering, washing and drying in warm air.

8. The product obtained by the process defined by claim 7.

FREDERICK E. DEARBORN.